April 5, 1949.  J. A. PEOPLES, JR., ET AL  2,466,041

SERVO SYSTEM AND CONTROL THEREOF

Filed March 30, 1943  6 Sheets-Sheet 1

INVENTORS:
J. A. PEOPLES, JR.
R. SCHEIB, JR.
BY R. C. GOERTZ

THEIR ATTORNEY

April 5, 1949.  J. A. PEOPLES, JR., ET AL  2,466,041
SERVO SYSTEM AND CONTROL THEREOF
Filed March 30, 1943  6 Sheets-Sheet 2
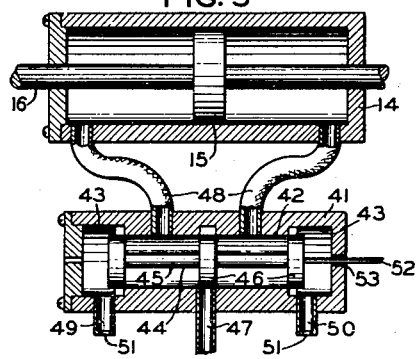
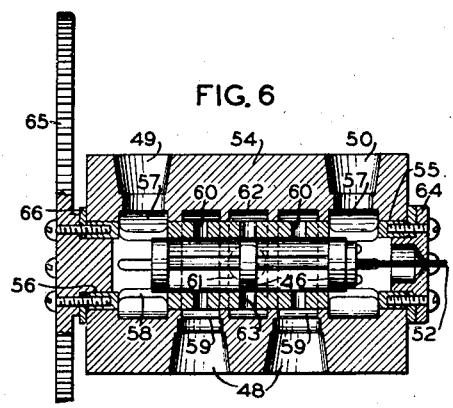
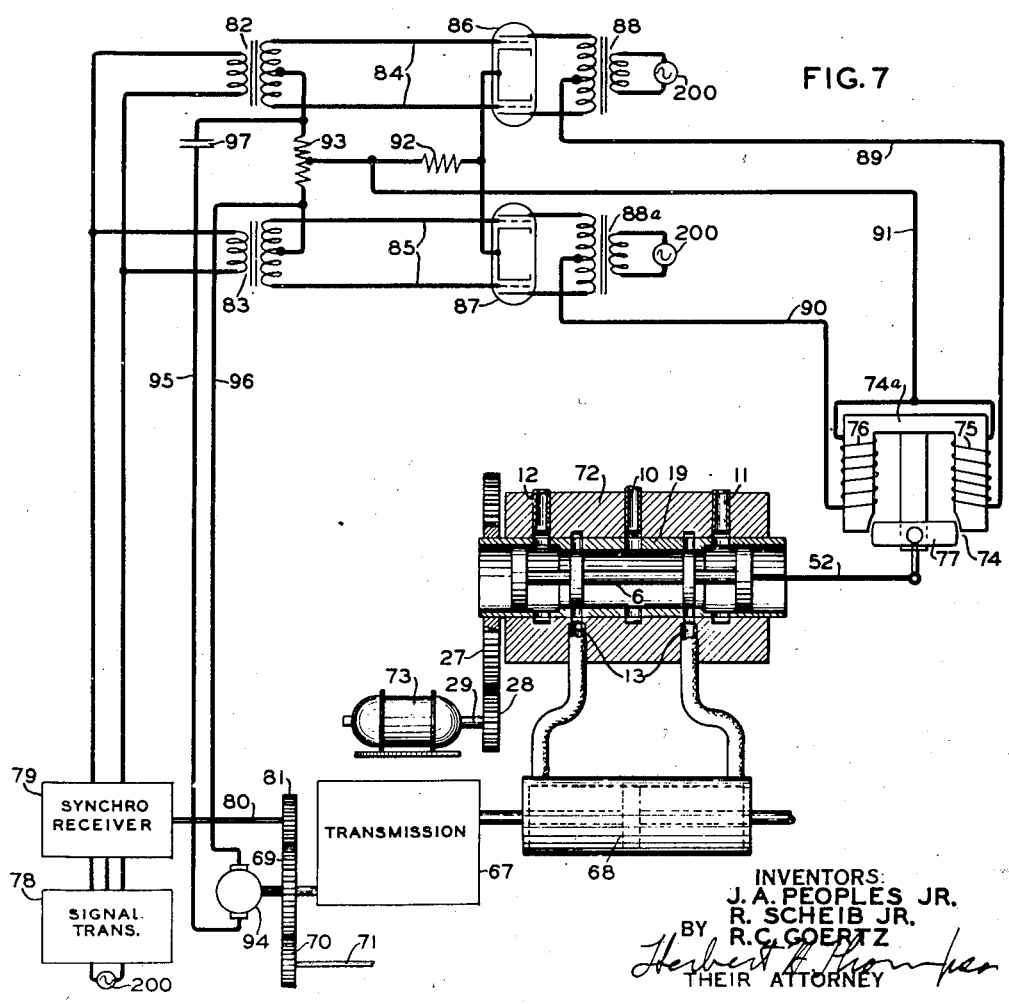
INVENTORS:
J. A. PEOPLES JR.
R. SCHEIB JR.
R. C. GOERTZ
BY
THEIR ATTORNEY April 5, 1949.    J. A. PEOPLES, JR., ET AL    2,466,041
SERVO SYSTEM AND CONTROL THEREOF Filed March 30, 1943                6 Sheets—Sheet 3

INVENTORS:
J. A. PEOPLES JR.
R. SCHEIB JR.
R. C. GOERTZ
BY
THEIR ATTORNEY

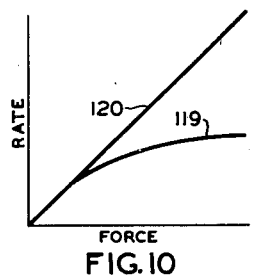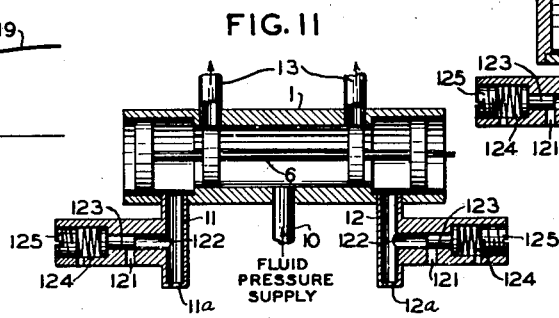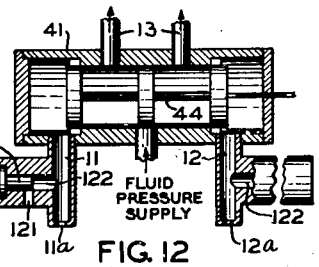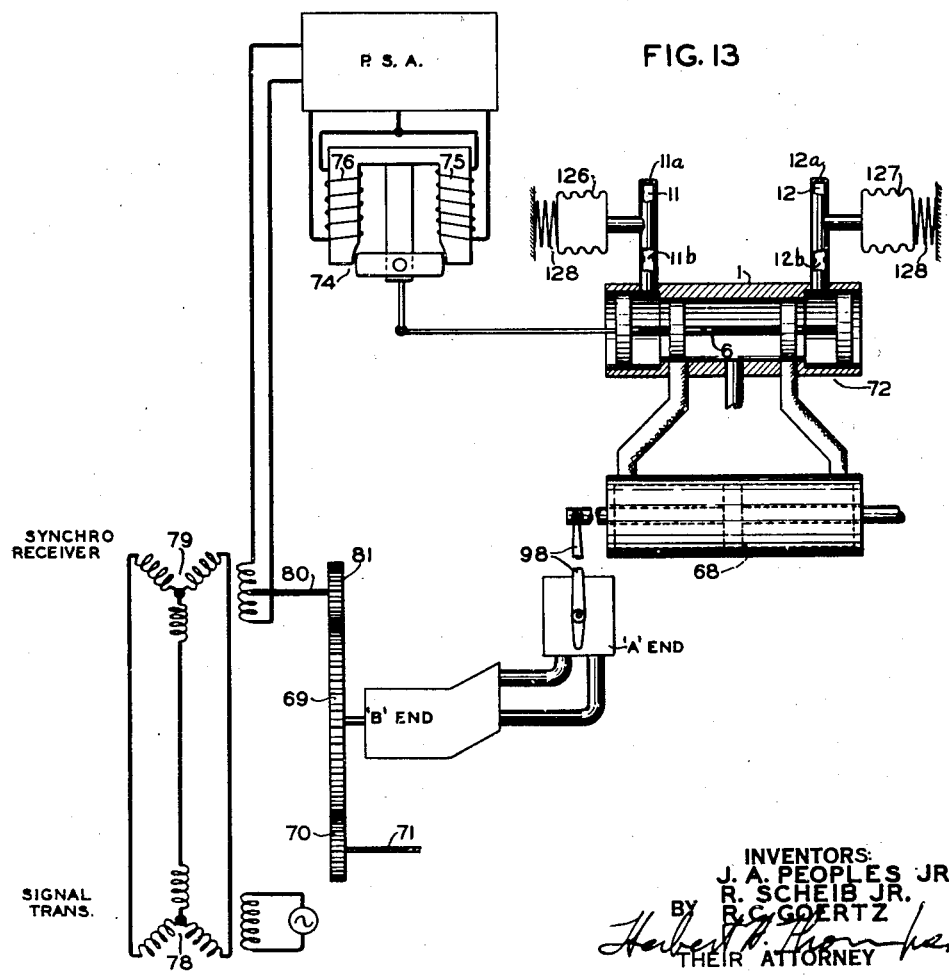

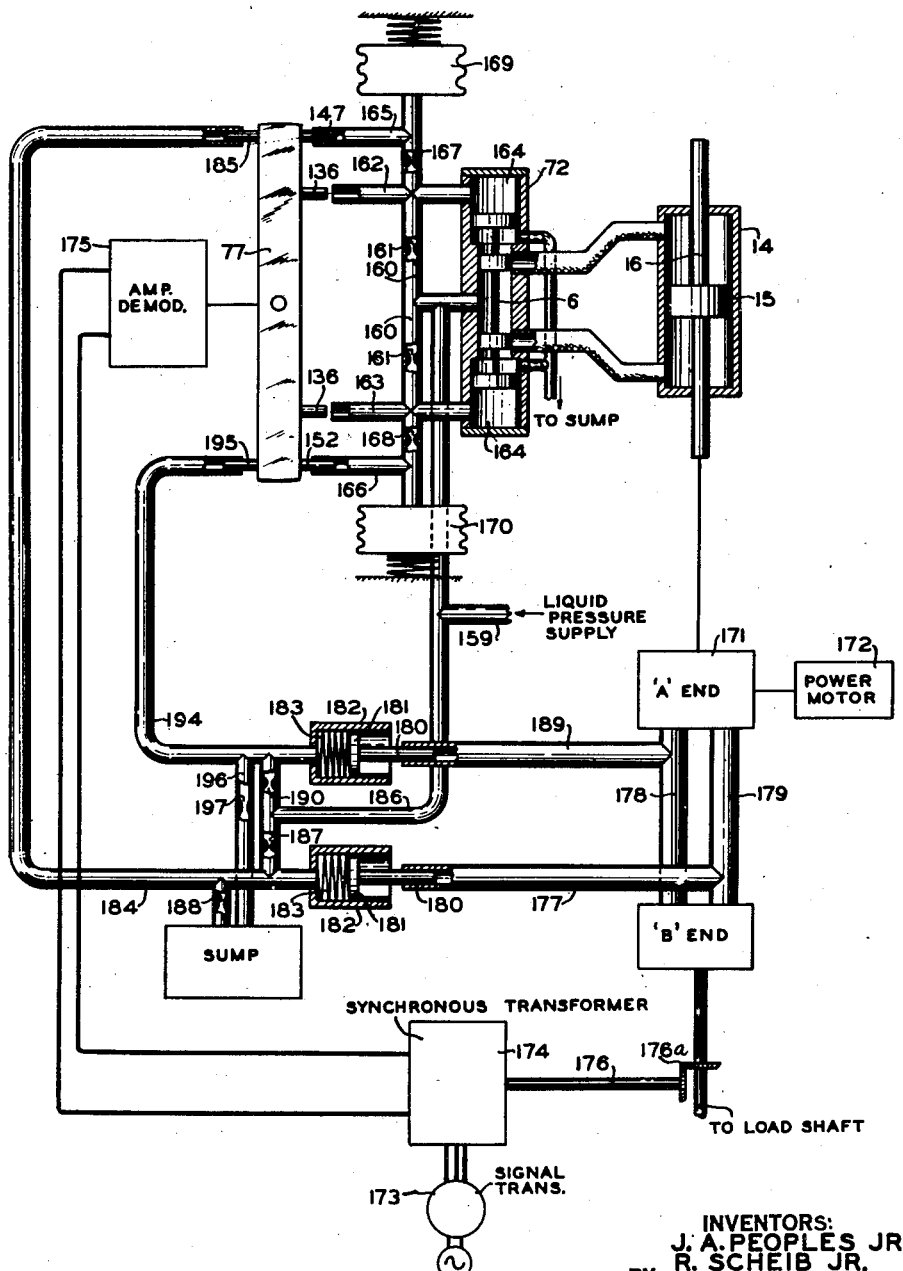

Patented Apr. 5, 1949

2,466,041

UNITED STATES PATENT OFFICE 2,466,041

SERVO SYSTEM AND CONTROL THEREOF

James A. Peoples, Jr., Richard Schelb, Jr., and Raymond C. Goertz, Hempstead, N. Y., assignors to The Sperry Corporation, a corporation of Delaware Application March 30, 1943, Serial No. 481,172

19 Claims. (Cl. 121—41)

Our invention particularly relates to hydraulic servo systems and also to control elements and combinations thereof which are responsive to hydraulic conditions or pressures in the system for providing extremely accurate, quickly responsive and stable operations of the system.

In the following, we have described our novel systems and control elements therefor as embodying a "Vickers" type transmission mainly for exemplary purposes. A transmission of this character comprises an "A" end including pistons driven by a motor, and lever means for varying the displacement of these pistons, whereby the flow of oil, or other liquid which may be employed, through a connecting, circulating system to the "B" end, is controlled both in direction and rate. The "B" end comprises a hydraulic motor, driven by the fluid supplied from the "A" end, which serves to move or position a positionable element such, for example, as a gun turret. The rate of operation of the "B" end and its direction will depend upon the control over the "A" end. A piston, herein called a "stroke regulating piston," which is connected to the control lever of the "A" end of the transmission system, functions in response to the liquid supplied to the cylinder thereof to position the control lever of the "A" end of the "Vickers" transmission, regulating the displacement of the pistons therein and thereby controlling the output speed of the "B" end.

It will be understood that the novel valve of our invention, hereinafter particularly described, may be employed to control any fluid-actuated element such as a power piston and it has particular application in controlling the stroke regulating piston of a hydraulic servo system. In the following, when we refer to a "stroke regulating piston," we mean the piston which is employed to control the "A" end of a "Vickers" type hydraulic transmission or servo system, movement of the stroke regulating piston causing changes in the displacement of the "A" end and thereby changes in the output speed of the "B" end.

Since our invention particularly resides in control elements and combinations thereof which are admirably suited to control the stroke regulating piston of a transmission system of the foregoing character, we have illustrated and in the following described the various control elements and combinations in connection with a stroke regulating piston and a "Vickers" system controlled thereby. However, it will be understood that the various novel control elements and combinations thereof may be employed and may fulfill the same function in other types of systems.

The first object of our invention resides in providing a valve for controlling the admission of fluid under pressure to a cylinder having a piston therein, or to any work-performing device, and the exhaust of fluid therefrom, which valve is so constructed and arranged that the rate of the piston, or other element driven by the fluid, will be substantially proportional to the force which is applied to and effects an operation of said valve.

Another object resides in providing a valve adapted to fulfill the above function but which, due to the novel construction, thereof, requires no mechanical connection between the valve element and the power piston or stroke regulating piston controlled thereby or the provision of additional means for returning a signal-responsive torque motor and the valve element connected therewith to neutral or null position. It is a further object to provide a novel control valve of the foregoing character which provides a piston-rate to applied force proportionality which is substantially a constant and which is somewhat independent of fluid or liquid viscosity.

More particularly, it is an object of our invention to provide a control valve having the foregoing operational characteristics which will, due to the novel construction thereof, return to a neutral or cut-off position when the applied displacing force has been relieved.

It is another object of our invention to provide a control valve of the character above pointed out for controlling the displacement of an element or piston by fluid means which control valve includes means for effecting a rate of displacement of said element or piston which is substantially linearly proportional to the control force applied to said valve.

Another object lies in the provision of a hydraulic system including a valve of the above character and repeat-back means whereby acceleration of the driving end of the hydraulic transmission is approximately proportional to the force applied to the valve.

Other objects lie in providing a system of this character in which a manually operable speed control lever lies in a neutral position for all uniform speeds; and one in which the position of the manual control or the force applied to it will provide an indication of the operational speed of the hydraulic transmission.

Other objects reside in providing in a hydraulic system a valve of the character hereinbefore pointed out together with means cooperable therewith to provide a wipe-out of the speed lag, which occurs under transient conditions, when a steady state or uniform speed output condition prevails.

Still a further object resides in providing in a hydraulic system means for obtaining a hydraulic signal which is proportional to the torque and torque rate of a force applied, for example, by a signal-responsive element to the valve; and, more particularly, wherein the hydraulic torque and torque rate signal is obtained through a delayed repeat-back action to the element applying the valve-displacing force.

With the foregoing and other objects in view, our invention will best be understood from the following description read in connection with the accompanying drawings, in which—

Fig. 5 is a somewhat schematic representation of a modified form of valve;

Fig. 6 is a longitudinal section through a valve similar to that disclosed in Fig. 5, but slightly modified;

Figure 1:
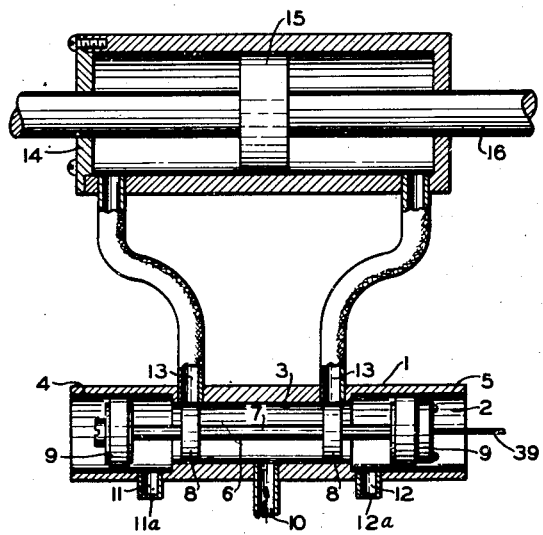
Fig. 1 is a somewhat schematic sectional view showing one form of the control valve of our invention associated with a piston.
Figure 8:
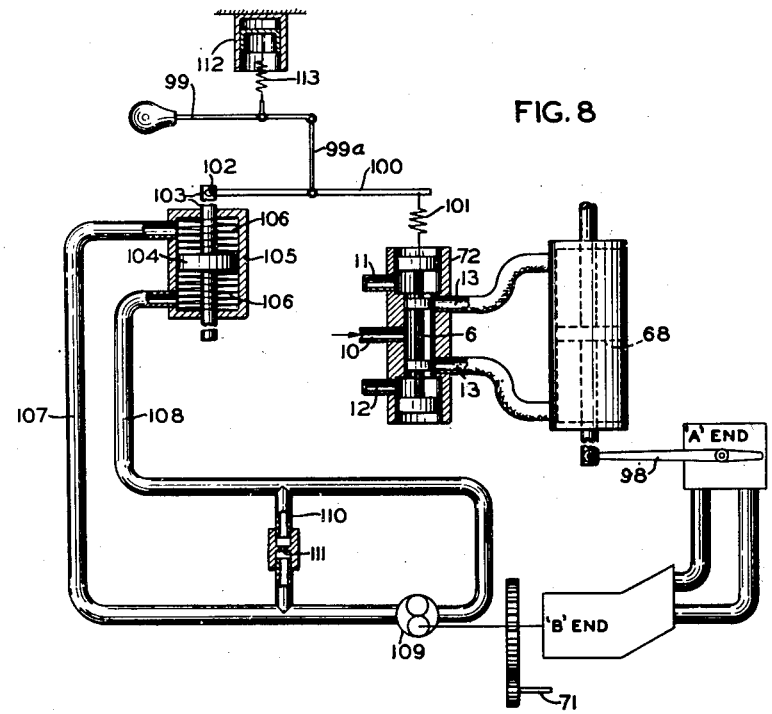
Figure 9:
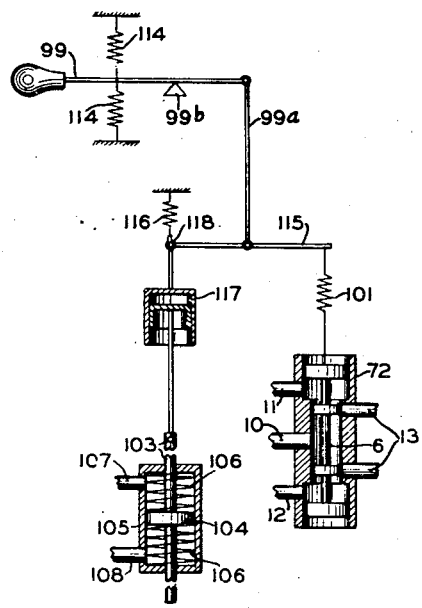
Figure 14:
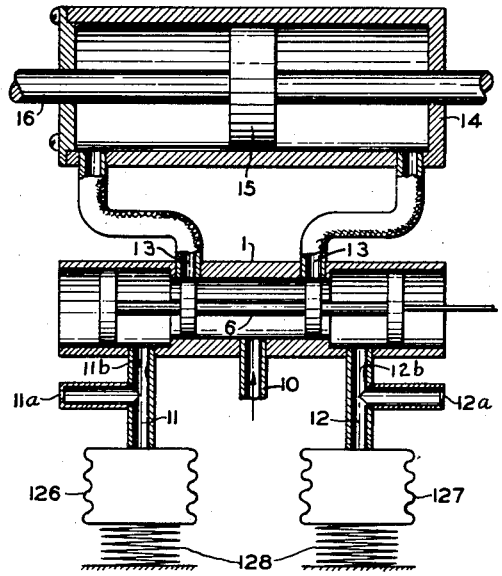
Figure 15:
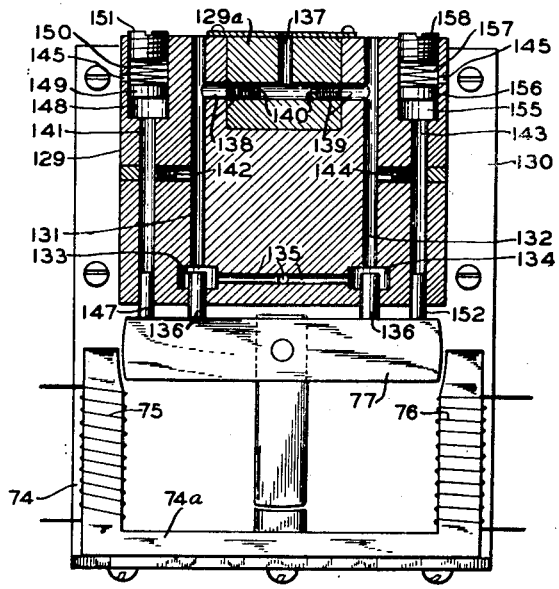

Fig. 7 schematically discloses a servo system embodying a valve operable in the manner of the valves shown in Figs. 1 and 5;

Fig. 8 is a schematic representation of a manually operable, speed control system in which the control valve of our invention is employed;

Fig. 9 discloses a modification of the system of Fig. 8;

Fig. 10 illustrates a characteristic curve of the valve controls of Figs. 1 or 5;

Fig. 11 is a somewhat schematic view of a modification of the valve of Fig. 1;

Fig. 12 is a somewhat schematic showing of a modification of the valve of Fig. 5;

Fig. 13 discloses a servo system embodying the valve of our invention and means for providing a speed lag with wipe-out repeat-back thereto;

Fig. 14 is a view, partially in section, of a control valve and associated piston together with means for providing a speed lag with wipe-out control of an associated servo system;

Fig. 15 is a view, partially in section, of a unit for supplying a hydraulic actuating pressure to the valve of our invention, which hydraulic pressure is proportional both to the torque and the torque rate of a force exerted thereon by the signal-responsive torque motor associated with the unit; and Fig. 16 discloses somewhat schematically a substantially entirely hydraulically controlled servo system including the novel valve and associated control elements disclosed in the foregoing figures.

Figure 2:
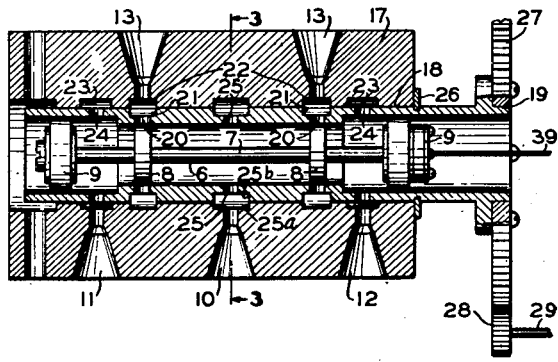
Fig. 2 is a longitudinal section through a valve of the form disclosed in Fig. 1, but slightly modified.

Referring first to Fig. 1, wherein we have disclosed somewhat schematically one form of novel control valve for a fluid-operated piston or for the stroke regulating piston of a "Vickers" type transmission, 1 indicates generally the valve casing which, however, is preferably formed as shown in Fig. 2. Fig. 1 serves to illustrate, for the purposes of general explanation, the construction of the valve shown more specifically in Figs. 2, 3 and 4. The casing 1 is provided with a longitudinal bore indicated generally at 2 which includes the zone 3 of a diameter smaller than that of the zones 4 and 5. Preferably, the zone 3 of lesser diameter, lies intermediate the zones 4 and 5 of greater but preferably equal diameters. Within the bore 2 is slidably fitted a piston valve 6 comprising a stem 7 and pairs of spaced lands 8 and 9. The lands 8 are adapted slidably to fit within the zone 3 of the valve casing while the lands 9 slidably fit within the enlarged bores 4 and 5. An inlet passage 10, which is adapted to be connected with a source of fluid or a liquid under pressure, communicates through an inlet port with the zone 3 of the valve casing; and exhaust passages 11 and 12 communicate, respectively, with the enlarged portions of the zones of the bores 4 and 5 and between adjacent lands 8 and 9. The inlet passage 10 communicates with the bore of the valve between the lands 8, and a second pair or intermediate passages 13 communicate through ports with the bore of the valve. The passages 13 serve to connect the valve 1 with the cylinder 14 within which the work piston controlled thereby or the stroke regulating piston 15 is slidably fitted. It will be understood, of course, that in hydraulic servo systems the piston rod 16 of the stroke regulating piston is connected with the control lever of the "A" end of the "Vickers" transmission. One of the passages 13 communicates with the cylinder 14 on one side of the piston 15 while the other communicates therewith but to the other side of the piston. The piston valve 6 is adapted to be slid axially of the valve casing to control both the admission of fluid under pressure to one side of the piston 15 and the exhaust of fluid from the other side thereof. In the neutral position of the valve piston, that is, when no fluid is supplied to the cylinder 14, the lands 8 are designed to lie in registry with the ports of the passages 13. However, when the valve piston is moved in one direction or the other, for example, to the right as viewed in Fig. 1, fluid under pressure, which is supplied to the bore of the valve and between the lands 8, will enter one passage 13 through the intermediate port and cause the piston 15 to move toward the left. However, simultaneously, when the piston valve is moved in the above manner, the other land 8 will open the other intermediate port and permit fluid to exhaust from the cylinder 14 into the bore of the valve and between the lands 8 and 9.

In accordance with our invention, the exhaust passages 11 and 12 are provided with a restricting orifice 11a and 12a, respectively, which are designed to retard the flow of exhausting fluid therethrough and cause a fluid pressure to be built up between adjacent lands 8 and 9. Therefore, when the piston valve is moved toward the right as above explained, exhausting fluid will build up a pressure between the lands 8 and 9 at the left-hand end of the piston valve. Since the area of the land 9, which is subjected to this fluid pressure, is greater than that of land 8, a resultant pressure occurs tending to move the piston valve toward the left in opposition to the movement thereof which initiated the build-up of pressure in the exhausting liquid and a movement of the stroke regulating piston.

The rate of flow of the exhausting fluid which is retarded by the restricting orifices 11a or 12a is determined by the rate of the stroke regulating piston 15. Furthermore, the rate of fluid flow will be independent of any load on the piston. Therefore, the pressure built up in the exhausting fluid is a function of piston rate and since the pressure developed by the exhausting fluid exerts a proportional force urging the piston value in a direction opposite to that in which it moved to initiate movement of the piston 15, the rate of movement of the piston 15 will be approximately proportional to the force applied to the piston valve. In other words, it may be said that the force applied to the piston valve by the exhaust fluid is proportional to the rate of movement of the piston 15.

Although the pressure build-up in the exhausting fluid is a function of piston rate, the relationship therebetween depends upon the nature of the orifice and fluid viscosity. However, by employing a thin edged orifice, the pressure to rate of flow relation will be practically independent of viscosity thereby substantially eliminating the effect of changes in fluid temperature on this relation.

Figure 3:
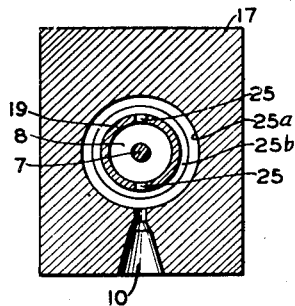
Fig. 3 is a transverse section of Fig. 2 taken in about the plane 3—3 thereof.

The control valve for the stroke regulating piston is preferably made in the form shown in Figs. 2 and 3, wherein a sleeve is rotatably interposed between the valve casing and the valve piston. As shown in Fig. 2, the valve casing 17 is provided with a longitudinal bore 18 of substantially uniform diameter throughout. A sleeve 19 is rotatably fitted within the bore 18 and is provided with zones of lesser and greater internal diameters corresponding to the zones 3, 4 and 5 of the schematic showing in Fig. 1. The piston valve 6, comprising the pairs of lands 8 and 9, is slidably fitted within the sleeve 19, and the lands 8 control the flow of fluid through ports 20 which communicate with circumferential grooves 21 on the exterior of the sleeve. Grooves 21 preferably register with circumferential grooves 22 formed in the walls of the bore 18. The grooves 22 communicate through ports with the intermediate passages 13 and with the cylinder of the stroke regulating piston as above described. The walls of the bore 18 are also provided with circumferential grooves 23 which register with ports 24 extending laterally through the sleeve 19 and also communicate through ports with exhaust passages 11 and 12 which include restricting orifices (not shown) as above described. Likewise, the inlet passage 10 in the valve casing communicates with registering annular grooves 25a and 25b in the valve casing and sleeve, groove 25b in the sleeve communicating with the bore within the sleeve through ports 25. Relative longitudinal movement of the sleeve with respect to the valve casing may be prevented by providing the sleeve with an exterior, circumferential groove within which the split ring 26 may be received and secured to the valve casing. One end of the sleeve 19 has mounted thereon and secured thereto a gear 27 which is adapted to mesh with a gear 28 on the shaft 29 of a motor (not shown). With this construction, the motor may serve continuously to rotate the sleeve 19 of the valve, whereby substantially to eliminate static friction between the valve piston and the sleeve. However, the valve piston may be operated to control the flow of fluid to and the exhaust of fluid from the cylinder of the stroke regulating piston in the manner hereinabove described.

Figure 4:
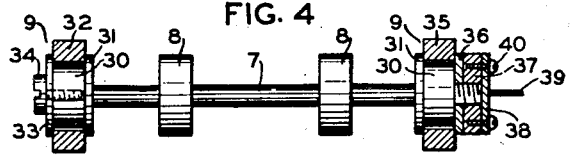
Fig. 4 is an elevation view, partially in section, showing a preferred construction of the valve piston.

In Fig. 4, we have illustrated a preferred manner of constructing and assembling the piston valve. The stem 7 of the piston and lands 8 are formed as an integral unit, and both ends of the stem 7 are provided with integral enlarged cylindrical ends 30 having shoulders 31. An annular element 32 is adapted to fit around the enlarged ends 30, but the interior diameter thereof is slightly greater than the diameter of the enlargement 30. At one end of the piston, a washer 33 is adapted to prevent movement of the ring 32 axially of the piston valve but to allow eccentric or lateral movement thereof whereby, if the zones 3, 4 and 5 of the valve or the valve sleeve vary slightly in eccentricity, the valve piston may be properly fitted therewithin. A stud 34 serves to complete the assembly forming the land 9 at one end of the valve piston. At the other end thereof, a ring 35 similar to that above described is mounted over the enlargement 30, and a washer 36 serves to hold it against axial movement. A nut 37 is threaded on the end of the piston stem securely to hold the washer 36 and assembly in place while an end member 38 to which an operating rod or wire 39 is connected may be fastened to nut 36 by the screws 40. This construction allows for slight misalignments of the zones of the valve with which the lands of the valve piston cooperate in controlling flow of fluid therethrough while assembly thereof is relatively simple.

In Fig. 5, we have shown a modified form of valve which functions in substantially the same manner as that hereinabove described to provide a rate of movement of the stroke-regulating piston which is proportional to the force applied to the piston of the valve. In the somewhat schematic showing of this modification, we have illustrated generally a valve casing at 41 within which is slidably fitted a control piston, all of the lands of which are of substantially the same diameter. The casing 41 is provided with a longitudinal bore 42 which, in the embodiment herein shown has enlarged zones 43 at both ends thereof. The piston valve, indicated generally at 44, includes a stem 45 having lands 46 which may be formed integrally therewith. In the embodiment illustrated, the valve piston includes three lands, the central one of which is adapted to register with an inlet port through which an inlet passage 47 communicates with the bore of the valve. The inlet passage, of course, will in operation connect with a suitable source of fluid under pressure, and a movement of the valve piston in either direction will control the flow of this fluid to one or the other of the intermediate passages 48 which also communicate with the bore of the valve. The end lands are so arranged relative to the central bore and the enlarged ends 43 thereof that when the piston valve is moved in one direction or the other sufficient to permit fluid under pressure to pass to one of the intermediate passages 48, one of these lands will permit the exhausting fluid to flow into the adjacent enlarged zone 43 of the bore and thence to the exhaust passage 49 or 50.

In practice, as shown in Figs. 5 and 6, the bore or sleeve is preferably of sufficient length to provide adequate bearing surfaces for the end lands, the bore or sleeve being grooved or slotted, respectively, adjacent the end lands an axial distance sufficient to exhaust the fluid from one intermediate passage when the piston is moved to admit fluid under pressure to the other intermediate passage. Furthermore, it is not necessary to provide enlarged end zones in the bore of the valves shown in Fig. 5 but the grooves or slots above described may be employed to pass exhaust fluid from one side of the end lands to the other side thereof as shown in Fig. 6.

Each of the exhaust passages has a restricting, preferably thin-edged, orifice 51 associated therewith whereby to cause the exhausting fluid to develop a pressure in the enlarged zone of the valve bore to which it is admitted. Since the fluid pressure so developed will exert a force on the outer side of the end land while the fluid pressure against the other side thereof and one side of the intermediate land will be equal, a resultant force will be produced tending to move the valve piston back to a neutral position or to a position in which the intermediate land covers the inlet port.

Since in this modification of our valve we employ the action of fluid under pressure against the ends of the piston valve, the ends of the bore are closed, as shown, and the valve-operating member or wire which connects the valve piston with some suitable torque motor extends through a small orifice 53 formed in one of the end walls of the valve casing. In order to simulate substantially the same conditions at the other end of the valve casing, the closure member for the bore at that end may also be provided with a small orifice, as shown. Furthermore, these orifices may be used to cause the exhausting fluid to develop a pressure against the outer sides of the end lands so that orifices 51 may be omitted.

In Fig. 6 we have shown a preferred construction of the valve schematically shown in Fig. 5, wherein a rotatably mounted sleeve is interposed between the valve casing and the valve piston for the same purpose as the sleeve 19 hereinbefore described in connection with Fig. 2. In the embodiment shown the valve casing 54 includes exhaust passages 49 and 50, intermediate passages 48, and an inlet passage which communicates with the interior bore of the sleeve as hereinafter described. The casing 54 has a longitudinal bore 55 therein of substantially uniform diameter throughout, and the sleeve 56 which is rotatably fitted therewithin also has an interior bore of substantially uniform diameter. The exhaust passages 49 and 50 communicate with circumferential grooves 57, respectively, with which ports 58, extending laterally through the sleeve 56, are adapted continuously to register. The intermediate passages 48 also communicate with circumferential grooves 59 in the walls of the bore of the valve casing with which lateral ports 60 in the valve sleeve continuously register. The inlet passage communicates through a port 61 with the circumferential groove 62 in the wall of bore 55, and ports 63 extending laterally through the sleeve communicate therewith. The central land 46 of the valve piston is designed to control the admission of fluid under pressure from the inlet passage to either of the intermediate passages and simultaneously the exhaust of fluid from the other intermediate passage to one or the other of the exhaust passages. As above described, the operating member 52 for the valve piston passes through a small orifice in an end plate 64 which is preferably secured to the sleeve in any desired manner and serves to prevent axial movement of the sleeve in one direction relative to the valve casing. A gear 65 is fastened to the other end of the sleeve 56 to impart rotary movement thereto and in conjunction with the shim 66 prevents relative axial movement between the sleeve and the valve casing.

In Fig. 7, we have disclosed for exemplary purposes and in a somewhat schematic manner one form of servo system and controls therefor including a valve for controlling the stroke-regulating piston which may comprise either of the forms hereinabove described. In this system the "Vickers" transmission, including both the "A" and "B" ends thereof, is represented generally at 67, the stroking piston generally at 68, and the output of the transmission is represented as gear 69 meshing with gear 70 and driving the load shaft 71 to which the positionable member is connected. Our novel valve indicated generally at 72 includes the piston valve 6 of the character hereinbefore described and the sleeve 19 which is rotated by the motor 73. Actuation of the valve piston 6 in one direction or the other is effected by means of the torque motor 74. Any form of torque motor may be employed in connection with the valves of our invention, but it will be observed that no centralizing springs or other means are required to return the armature thereof to a neutral or null position after the signal has faded or gone to zero. For exemplary purposes, the torque motor comprises the core 74a on each leg of which are mounted coils 75 and 76, respectively. The armature 77 thereof is connected to the wire or rod 52 extending from the piston valve 6.

The electrical control circuit which controls the operation of the torque motor preferably includes a phase sensitive amplifier-demodulator and a "Selsyn" transmitter 78 and synchro-receiver 79 connected as shown. The "Selsyn" transmitter is connected to a suitable source of alternating current, and when the rotor thereof reflects an angular displacement of some control or reference element, a signal will be supplied to the torque motor to effect an operation of the servo system to move the positionable element in the same direction as the reference member and through the same angular displacement. The position repeat-back is obtained through synchro-receiver 79, which is connected to the "Selsyn" transmitter in any standard manner so as to provide an A. C. output voltage from the receiver which is proportional to the error and which reverses in phase when passing from a lagging error to a leading error. For illustration purposes, we have shown the rotor of the synchro-receiver connected with the transmission through shaft 80 and gear 81 which meshes with gear 69. The synchro-receiver is connected through transformers 82 and 83 with the parallel branch circuits of a phase sensitive amplifier which in the embodiment shown provides full wave demodulation. The secondaries of the transformers 82 and 83 are connected respectively through conductors 84 and 85 with twin triode tubes 86 and 87. The plates of the tube 86 are connected across the secondary of the transformer 88, the primary of which is connected to a source of alternating current 200, to which the "Selsyn" transmitter is also connected. Likewise, the plates of tube 87 are connected across the secondary of a transformer 88a, the primary of which is also connected to the source 200 of alternating current. A mid-tap on the secondary of transformer 88 is connected through conductor 89 to the coil 75 of the torque motor and, in a similar manner, a mid-tap from the secondary of transformer 88a is connected through conductor 90 to the coil 76 of the torque motor. The opposite ends of each of the coils 75 and 76 are connected together and through conductor 91 and resistor 92 to the cathodes of the two tubes. Mid-taps on the secondaries of transformers 82 and 83 are connected together through a resistance 93 and from a central tap on said resistance through resistor 92 to the cathodes of the two tubes. In order to obtain a rate repeat-back from the output of the servo system, we may mount a voltage generator 94 on the output shaft thereof and connect it through conductors 95 and 96 across the resistor 93, a condenser 97 being included in one of the legs thereof.

It will be understood that the foregoing described system is represented in the main for the purpose of describing the operation of a system including our novel control valve. Assuming that the "Selsyn" transmitter provides a signal proportional to the displacement of a reference member, this signal will be transmitted through the phase sensitive amplifier to one of the coils 75 or 76 of the torque motor, depending upon the direction in which the displacement occurs, and the signal will be proportional to the magnitude of the displacement, for displacements which are not too large or are insufficient to produce saturation of the amplifier. When this occurs, the torque motor operates to move the piston valve 6 in one direction or the other, supplying fluid under pressure to one side of the stroke-regulating piston 68 and exhausting it from the other side thereof. This will produce movement of the stroke-regulating piston at a rate proportional to the force applied to the piston valve 6 from the torque motor and will cause the transmission system to rotate the load shaft in one direction or the other depending on the phase sense of the signal and at a speed which is dependent upon the position which the piston 68 assumes. The repeat-back of the movement of the positionable member occurs through the synchro-receiver, and when both the reference member and the positionable member have experienced a displacement of like magnitude, the signal will be reduced to zero.

Furthermore, the repeat-back from generator 94 to the phase sensitive amplifier will reduce the signal to zero when the positionable member is being moved in timed relation to the reference member, and under this condition the piston valve 6, due to the pressure reaction thereon, will return to a cut-off position. The generator 94 impresses a voltage across the resistance 93 and capacitance 97 which is proportional to the rate or speed of the transmission output. By making the time constant of the series condenser and resistor network sufficiently large, it is possible to obtain stable operation without objectionable speed lag.

It will be observed that in a servo system employing a valve of the character herein described that the valve piston itself serves to restore the armature of the torque motor to its original position, thereby eliminating any need for springs or other devices for returning it to null position, which devices are ordinarily not highly dependable but vary in characteristic with wear and usage.

Figs. 8 and 9 disclose novel speed control servo systems employing our novel form of valve. In Fig. 8, the valve 72 is shown connected to control the stroke-regulating piston 68 of a "Vickers" type transmission, the piston rod thereof being connected with the control lever 98 for the "A" end of the transmission. A manual control lever 99 is adapted to impart a force to the piston 6 of the control valve 72. In the embodiment illustrated, this is accomplished through an intermediate lever 100 to which lever 99 is connected, preferably, intermediate the ends thereof through link 99a. One end of lever 100 is connected through spring 101 to the piston valve 6 of the valve, and the other end thereof is pivotally connected at 102 to one end of a piston rod 103. Rod 103 is provided with piston 104 which is slidably fitted within cylinder 105 and biased by springs 106 to a central position. A fluid circulating system comprising the conduits 107 and 108 is connected with the cylinder 105 on opposite sides of the piston therein and to a fluid pump 109. Pump 109 is of a reversible type and driven from the "B" end of the "Vickers" transmission. A by-pass conduit 110 having an orifice 111 therein is connected between the two branches of the circulating system and between the pump 109 and the cylinder 105. In this system, the manual control lever 99 is designed to occupy a position which is indicative of the speed of operation of the transmission system. For this purpose, therefore, a dash-pot 112 is provided, and the lever 99 is connected to the piston therein through a spring 113. In practice, spring 113 is stronger than the spring 101 and, likewise, springs 106 are relatively strong springs, that is, spring 113 offers greater resistance to compression or tensile forces than spring 101.

In operation, the lever 99 is moved to apply a force to the piston valve 6 of the control valve in one direction or the other. This causes the stroke-regulating piston 68 to move at a rate proportional to the force applied on the control lever 99 and to accelerate the servo system. Assuming, that the lever 99 is forced downwardly, having a fulcrum at its point of connection with spring 113, the system is arranged to cause the pump 109 associated with the "B" end of the transmission to build up a pressure through conduit 108 to the lower end of cylinder 105. The rate at which the pump 109 pumps fluid is determined by the "B" end speed and since the fluid passes through orifice 111, the fluid pressure developed by the pump is proportional to the "B" end speed. As the pressure develops in the cylinder, it will force piston 104 upwardly, the position thereof being determined by the "B" end speed, thereby progressively relieving the pressure applied on the piston 6 of the control valve through the operation of the manual control lever 99. The motions of piston 104 and control lever 99 are added differentially, and when the "B" end speed is sufficient to produce a pressure in the cylinder 105 which will entirely wipe out the applied force to the piston valve 6, the control valve will cut off the supply of fluid to the stroke-regulating piston, and the system will therefore continue to operate at this speed while the manual control lever 99 will remain in the position to which it was moved in initially applying the force to the valve 6, the action of the dash-pot connected thereto providing this operation.

Alternatively, the fluid pressure developed by pump 109 could be applied directly to the piston of control valve 72. In this event, it would be necessary to maintain the control force on the piston 6 and the dash-pot would be eliminated.

As above explained in connection with the operation of the system shown in Fig. 8, the position of the manually controlled lever 99 is indicative of the rate of the output of the servo. It will be noted that when a displacing force is applied to lever 99, a corresponding force is transmitted to the piston valve 6 of the control valve with a resulting displacement of said piston valve from a neutral position thereby producing an acceleration of the servo output. By means of the hydraulic repeat-back signal which operates the piston 104 and its associated piston rod, the force applied to the control valve is wiped out by a displacement of the piston rod 103 which corresponds to the speed of the output of the servo. When these conditions obtain, the output rate of the servo is a constant. The wipe-out of the signal applied to the control valve occurs without any substantial movement of the control lever 99, and since the displacement produced by the repeat-back signal is a measure of the speed of the output of the servo and is just sufficient to offset the displacement produced by lever 99 and to thereby reduce the force applied to the piston valve 6 of the control valve to zero, the position of the lever arm will be a measure of the output rate of the servo. When, of course, the force displacing the piston valve 6 from its neutral or unactuated position is reduced to zero, the restoring pressure developed by the exhausting fluid will restore the piston valve to its initial, neutral position.

In Fig. 9 we have illustrated only a portion of a servo system, the balance of which may be generally similar to that shown in Fig. 8. Both of these systems are manually operable, speed control arrangements. In the control arrangement of Fig. 9, however, the manually operated lever 99 will assume a neutral position for all uniform speeds of operation of the transmission system. In this control system, it is to be understood that the valve 72 is connected to the cylinder of the stroke regulating piston 68, and the cylinder 105 is connected in the fluid circulating system and to the conduits 107 and 108 as above described in connection with Fig. 8. Therefore, the control of the "Vickers" transmission and the repeat-back to the cylinder 105 is substantially the same as above described. In this embodiment, however, the lever 99 is connected between centering springs 114, and is pivotally supported at fulcrum 99b whereby it may be moved in opposite directions to actuate lever 115 through link 99a. One end of lever 115 is connected with the piston 6 of the control valve 72 through the spring 101 while the other end thereof is connected to a dash-pot 117. The piston of the dash-pot is connected to the piston rod 103 and the cylinder thereof is connected at 118 to the lever 115 as shown. A centering spring 116 is also connected to the lever 115 and dash-pot 117 at 118 for centering the cylinder of the dash-pot.

In the operation of this form of control, let us assume that lever 99 is urged in a downward direction, thereby imparting a force to the piston 6 of the control valve 72 which in turn causes the "B" end of the transmission to accelerate. This downward movement of lever arm 99 will cause lever 115 to pivot upwardly about its connection with the cylinder of dash-pot 117. When the speed of the "B" end of the transmission, through the medium of the pump 109, develops sufficient pressure in the lower end of cylinder 105 as to move dash-pot 117 upwardly, this movement will cause lever 115 to rotate about its connection with the link 99a and thereby wipe out the force applied to the piston 6. The valve piston will therefore return to cut-off position and the system will continue to operate at the speed developing the pressure which was sufficient to wipe out the original signal. When the force is relieved on the piston 6, the manually operated lever 99 will return to its original position through the action of the centering springs 114. Centering springs 114 and 116, in practice, offer greater resistance to compression or tensile forces than spring 101.

The operation of the system fragmentarily shown in Fig. 9 is, as hereinabove indicated, generally the same as that shown in Fig. 8 with the exception that the manually operated lever arm 99 returns to a neutral position when released and therefore will occupy a neutral position for all constant output rates of the servo. In the system of Fig. 9, it will be observed that a displacement force is applied to the piston valve 6 of the control valve which is dependent upon the amount of displacement of the control lever 99 from a neutral position. The hydraulic repeat-back signal which actuates the piston 104 and its associated piston rod 103 is, of course, proportional to the output rate of the servo and the resulting displacement of lever 115 through the dash-pot 117 will be sufficient to reduce the pressure applied to the control valve to zero. The reduction of the manually applied displacing force on the piston valve to zero by the hydraulic repeat-back signal is accomplished without materially affecting the lever 99 and, therefore, when a condition of constant speed output of the servo is reached and the lever arm 99 is released, arm 99 will return to a neutral position under the influence of centering springs 114. When, of course, the rate signal repeat-back reduces the displacing force on the piston valve to zero, the restoring pressure developed by the exhausting fluid will restore the piston valve to its neutral position blocking the admission of fluid under pressure to and the exhaust of fluid from the passages 13. Under such conditions, the output rate of the servo is a constant.

The valves disclosed in Figs. 1 and 5 provide, as hereinbefore explained, a rate of the stroke-regulating piston which is proportional to the force applied to the piston of the control valve. However, as indicated in Fig. 10, the curve representing the rate-to-force proportion over a desirable range of forces is not linear but generally will assume the configuration represented at 119. It is desirable, however, that the rate control valve have an operating characteristic represented by the linear curve 120. To approximate a performance curve of the latter character, we prefer to arrange our valves in the manners disclosed in Figs. 11 and 12.

The valve shown in Fig. 11 conforms in all essential details to the valve of Fig. 1 but, in this form of our invention, a secondary orifice 121 is provided in the exhaust passage. The orifice 121 provides an outlet for fluid from the passage 122 which communicates with the bore of the valve casing and between said bore and the primary orifice 11a. In accordance with our invention a piston 123 is slidably fitted within the passage 122 and serves to control the size opening of the secondary orifice 121. The end of the piston 123 may be enlarged as shown, and a compression spring 124 may be interposed between it and a threaded plug 125 forming a closure for the end of the passage within which the enlarged end of the piston slides. A suitable vent is provided, of course, to discharge fluid which may leak past the piston 123.

When but a comparatively small force is applied to the piston valve 6 of the control valve, the orifice 11a is adequate to provide a rate-to-force relationship which is substantially linear. However, for higher forces the exhausting fluid pressure develops to a greater magnitude than it should to preserve the linear relationship, and the biasing spring 124 associated with the control piston of the secondary orifice 121 is so arranged as to permit the exhausting fluid pressure to move the piston 123 and thereby to open the secondary orifice 121 to a degree proportional to the exhausting fluid pressure. With this arrangement, a more linear relationship of rate-to-force is attained. As shown, this construction is carried out both with the exhaust passage 11 and the exhaust passage 12. Likewise, as shown in Fig. 12, a similar arrangement of elements is provided in order for the control valve to be endowed with the desired performance characteristics.

In Fig. 13, we have shown a servo system which is controlled in a modified manner, and the details of operation of this particular type of control will be explained in connection with Fig. 14. Referring first to Fig. 14, we have disclosed a combination of elements for providing a speed lag with wipe-out, hydraulic control of the control piston valve 6 of the stroke regulating valve. The stroke regulating valve is of the type shown in Fig. 1, including the exhaust passages 11 and 12 and exhaust orifices 11a and 12a. Orifices 11b and 12b preferably larger than the associated orifices 11a or 11b may be included in the exhaust passages 11 and 12, respectively, and between the orifices 11a or 12a and the bore of the valve body for damping purposes. In accordance with this modification of our invention, volumetrically displaceable means are connected with the exhaust passages of the control valve and communicate therewith between the bore of the valve body and the exhaust orifices 11a and 12a, respectively, or, in each case between the orifices 11a and 11b or 12a and 12b. In the embodiment shown, we have used Sylphon bellows 126 and 127, the interiors of which lie in communication with the exhaust passages 11 and 12, respectively. Compression of these bellows is preferably accomplished by the compression springs 128.

When the piston valve 6 of the control valve is moved in one direction, for example, to the right, fluid under pressure is admitted to the right side of the piston 15 and fluid passes to the exhaust passage 11, and since the rate of flow of fluid through orifice 11a is small, most of this exhaust fluid will act to expand bellows 126. If orifice 11a were completely closed, the back pressure and therefore the reaction force on the valve would be proportional to the displacement of piston 15. This gives the system the speed lag characteristic necessary for stability. The orifice 11a allows this volume of fluid to slowly leak out after a new speed has been attained, providing a speed lag wipe-out system.

In Fig. 13, we have shown the above-described modified valve connected in a servo system. This system may in all general respects conform to that disclosed in Fig. 7. However, it will be noted that due to the operation of the bellows providing both a speed lag and signal wipe-out repeatback, this system need not include any electrical rate circuit, but this function is supplied in a hydraulic manner.

In Fig. 15, we have disclosed a combination of elements which will provide a hydraulic pressure to actuate the piston of the control valve which is proportional both to torque and to time rate of change of torque applied thereto by the signal responsive torque motor. The torque motor may be of the general character illustrated in Fig. 7 and comprising the armature 77, core 74a, and energizing coils 75 and 76. The body 129 of this device which may be indicated generally at 130 has passages 131 and 132 formed therein which are adapted to be connected, respectively, to the spaces within the bore of a valve of the character shown in Fig. 1 and between the end lands 9 and the ends of the bores which are closed, as illustrated in Fig. 16. At the lower ends thereof, these passages communicate through ports with enlarged zones 133 and 134, respectively, these zones being provided with outlets 135 which may communicate with the sump of the system. Pistons 136 are associated with the armature 77 of the torque motor and serve to control the rate of flow of fluid from the passages 131 and 132, respectively, to the sump. Fluid under pressure is supplied continuously to these passages through an inlet passage 137 and branch passages 138 and 139, in each of which is interposed a restricting, preferably thin edged, orifice 140. In the embodiment herein illustrated, passages 137 and 138, 139, in part, are formed in a block 129a, inserts provided with the orifice 140 being secured therein, and the block then being secured within the body 129 as shown. Suitable gaskets may be used to prevent leakage from the passages 138 and 139 between the body and block.

Normally, when no signal is applied to the torque motor 74, fluid under pressure will flow from the inlet passage 137 to both passages 131 and 132 and to the zones of the bore of the control valve cylinder which lie on opposite sides of the piston valve 6 therein. Furthermore, fluid will exhaust from the passages 131 and 132 through the exhaust openings 135 at substantially equal rates so that equal fluid pressures will be supplied to both ends of the piston valve 6. However, when the armature of the torque motor, in response to a signal, is actuated in one direction or the other, for example in a clockwise direction, the piston 136 will move toward the port at the end of passage 131, thereby restricting the exhaust of fluid therefrom and developing a high pressure in this passage which will be communicated to the valve. Also, the other piston 136 will move away from the associated port end of the passage 132, reducing the pressure in passage 132 which is communicated to the other side of the piston valve as shown in Fig. 16. The result will be a force which tends to move the piston valve in one direction or another.

A second passage 141 communicates through an orifice 142 with the passage 131 and, similarly, a passage 143 communicates through an orifice 144 with the passage 132. These orifices are preferably thin edged orifices. The passage 141 is substantially closed at one end by a piston 147 slidably fitted therein and associated with armature 77. This piston transmits the force exerted thereon by the fluid in passage 141 to the armature 77 of the torque motor. At the other end thereof, passage 141 communicates with an enlarged bore 148 having a piston 149 slidably fitted therein. A compression spring 150 is interposed between piston 149 and a plug 151 which closes one end of the enlarged bore. A vent 145 is preferably provided to exhaust fluid which may leak past piston 149. The foregoing construction is carried out in association with the passage 143, that is, a piston 152 is associated with the armature 77 of the torque motor and disposed in pressure responsive relation to fluid within the passage 143. An enlarged bore 155 at the other end of passage 143, provided with a piston 156, compression spring 157 and plug 158, substantially duplicates the construction hereinbefore described.

The pressure differential which will be built up in passages 131 and 132 for a given torque developed by the torque motor will depend upon the net reaction of pistons 136, 147 and 152. Therefore, for a given applied torque, the pressure differential in 131 and 132 will be greater if this pressure differential is not transmitted to passages 141 and 143. The spring loaded pistons communicating with each of these passages make it necessary for oil to flow through orifices 142 and 144 before a change in pressure in 141 and 143 can occur. The motion of pistons 147 and 152 is at all times so small as to have small effect on the volume occupied by the oil. It therefore follows that if a torque is suddenly developed by the torque motor the pressure differential in 131 and 132 will be large at first and then decrease as the change in pressure is transmitted to pistons 147 and 152. It also follows the pressure signal which is transmitted to the piston valve associated therewith depends not only upon the torque developed by the motor, but also upon the time rate of change of the torque. The output may then be said to nearly be proportional to the input plus a term proportional to the rate of change of the input. The relative amounts of these two functions depend upon the dimensions of the system, i. e., the effective areas and lever arms of the pistons 136, 147 and 152, and by the time constant of the pressure response of passages 141 and 143. This is controlled by the size of the orifices 142 and 144 and by the spring constants of 150 and 157 and by the areas of pistons 149 and 156. The part of the signal which is proportional to the rate of change of applied torque tends to make the system more stable.

The operation of the embodiment of our invention shown in Fig. 15 is as follows and it will be noted that the corresponding embodiment shown in Fig. 16 will function in substantially the same manner. When no signal is applied to the torque motor 74, the armature 77 thereof will occupy the zero signal position shown in Fig. 15. However, when a signal is supplied to the torque motor, the armature thereof will be displaced either in a clockwise or counter-clockwise direction and through an angle dependent upon the magnitude of the signal voltage. Assuming that the armature is displaced in a clockwise direction, the fluid pressures in the passages 131, 132 will be differentially varied due to the change in position of the pistons 136. Under the assumed clockwise rotation, the pressure in passage 131 will increase while that in 132 will decrease. Because of the restricting orifice 142, fluid flowing from the passage 131 to the passage 141 will be time delayed. However, after a time interval, the fluid pressure in passage 141 will equal that in 131 assuming no greater signal is supplied increasing the angle of displacement of the armature 77 from its zero signal position. The fluid pressure in passage 141 is, of course, applied to the piston 147 which operates to apply a restoring force urging the armature toward its zero signal position. The cross-sectional area of the piston 147 which is exposed to the fluid under pressure in the passage 141 and the distance of the piston 147 from the pivotal axis of the armature 77 are so chosen that this restoring force is insufficient to return the armature to its zero signal position, but will partially restore the armature to this position. Of course, the converse will occur if the armature were to be moved in a counter-clockwise direction from its zero signal position by virtue of the piston 152.

It will be noted that displacement of the armature from its zero signal position in response to, let us assume, a signal building up to a constant magnitude is opposed by the fluid pressure reaction on the pistons 136. Initially, this is substantially the only pressure reaction affecting the armature because the pistons 149 and 156 may move to compress the springs associated therewith and therefore pressure reaction on the pistons 147 or 152, due to movement thereof with the armature in effecting the initial displacement, is substantially eliminated. When, however, the pressure builds up in either passage 141 or 143, after a time interval determined by the size of the orifices 142 or 144, the restoring force exerted by the piston 147 or 152 is arranged so that it will only partially restore the armature to its zero signal position and the angle of displacement of the armature under this latter condition will provide a differential fluid pressure in passages 131 and 132 which is proportional to the displacement of the armature or to the magnitude of the control signal voltage. The initial pressure differential, under the above assumed signal build up, due to the initial displacement of the armature will be substantially proportional to the signal voltage supplied to the torque motor plus the rate of change thereof.

It is believed that the foregoing description of the operation of the embodiment of our invention shown in Fig. 15 will show that the differential fluid pressures produced thereby constitute hydraulic signals which in magnitude are proportional both to displacement and rate of displacement of the input thereto. In other words, the differential hydraulic signals appearing in passages 131 and 132 are substantially proportional to the displacement of the armature of the associated torque motor and to the rate of change of displacement of said armature. These hydraulic signals are adapted to be transmitted from the passages 131 and 132 through suitable connections (not shown) to a control valve of the character of those herein shown and illustrated. Fig. 16 serves clearly to illustrate how these differential hydraulic pressure signals are applied to one embodiment of the control valve of the present invention wherein the force applied in displacing the valve from its neutral position is derived from fluid applied differentially to both ends of the piston valve. Obviously, hydraulic pressure could be applied in a similar manner to operate the piston valve of any of the embodiments of our control valve herein shown and described through, for example, suitable bellows, pistons or the like which are operatively subjected to said differential fluid pressure and which are connected with the piston valve of the valve to apply a force thereto and to move the same in accordance with such differential fluid pressure signals.

The hydraulic system disclosed in Fig. 16 includes a device of the character hereinabove described in connection with Fig. 15 with the exception that, instead of employing an expansion chamber or cylinder fitted with a spring biased piston, a Sylphon bellows is substituted therefor. However, fluid under pressure is supplied through conduit 159 and conduits 160, each including a restricting orifice 161, to two conduits 162 and 163, which schematically represent the passages 131 and 132 in Fig. 15, and to the bore in the casing of the control valve 72 between the end lands of the piston valve 6 thereof and the closed ends of the bore indicated generally at 164, respectively. Conduits 165 and 166 conform to passages 141 and 143 of Fig. 15, and orifices 167 and 168 conform to the orifices 142 and 144, respectively. Spring compressed bellows 169 and 170 are substituted for the enlarged bores and associated pistons 148, 149 and 155, 156.

When a signal is applied to the torque motor, the armature 77 thereof causes a sudden high pressure to develop either in the conduit 162 or 163, depending upon the direction of rotation of the armature, and consequently a movement of the piston valve 6 of the stroke rate valve 72 in one direction or the other. Through the operation of the orifices 167 and 168 and associated bellows, operable in response to the fluid pressure therein, the force applied to the piston valve 6 will be proportional to the torque and torque rate of the armature 77. This hydraulic signal will therefore cause the transmission 171 comprising the "A" end driven by a suitable motor 172, to drive the "B" end thereof in accordance with this signal. The original signal, of course, may be derived from the "Selsyn" transmitter 173 and through the synchronous transformer 174 and amplifier-demodulator 175 which is phase sensitive. A positional repeat-back to the transformer may be derived from the "B" end of the transmission and through shaft 176 and meshing gears 176a in substantially the same manner as described in connection with Fig. 7.

However, in this system, we have additionally provided for a hydraulic rate repeat-back. To accomplish this, a conduit 177 is connected to conduit 179 of the fluid circulating system represented by the conduits 178 and 179 between the "A" and "B" ends of the transmission. A piston 180 is schematically represented as slidably positioned in one end of the conduit 177 and has an enlarged end 181 suitably fitted within a cylinder 182. A compression spring 183 is interposed between the enlarged piston end 181 and the opposite end of the cylinder. Conduit 184 is connected with one end of the cylinder 182, and the other end thereof, as schematically shown, has a piston 185 slidably fitted therein and associated with the armature 77 to impart a force thereto which is dependent upon the pressure in the conduit 184. Fluid is supplied to this conduit through a conduit 186 and a restricting orifice 187, and fluid is exhausted from this conduit through an orifice 188 which may be comparatively larger than the orifice 187.

Likewise, a similar cylinder 182 and its associated parts are associated with a conduit 189 which connects with the conduit 178 of the fluid circulating system between the "A" and "B" ends of the transmission system. Further, the cylinder 182 is connected with a conduit 194 which is adapted to supply fluid pressure to a piston 195 associated with the other end of the armature 77 of the torque motor. Fluid is supplied from the conduit 186 to the conduit 194 through restricting orifice 190 and is exhausted therefrom through conduit 196 in which an orifice 197 is included. Orifices 187 and 190 are so correlated in size opening with respect to orifices 188 and 197 as to maintain the conduits 184 and 194 preferably filled with fluid or oil. The conduits 184 and 194 and associated parts are adapted to transmit a torque to the armature 77 of the torque motor when the pressure in the conduits 178 and 179 between the "A" and "B" ends of the system is changed.

The last-described portion of our system is designed to provide a hydraulic repeat-back to the torque motor so that a closer coordination of the system control means with the output thereof is obtained. Furthermore, the last-described portion of our system functions to provide a control adjustment of the operation of the transmission when the load shifts suddenly and to any appreciable amount. In other words, if the armature of the torque motor is biased in one direction with the transmission functioning to drive its load shaft and an appreciable load is suddenly applied thereto, a relatively brief, instantaneous pressure differential will be created in the branches of the last-described portion of our system comprising the conduits 184 and 194 which will produce an added reaction to the armature of the torque motor to cause the piston of the control valve to be operated in a direction either to increase or decrease the "A" end output of the transmission depending upon the speed of response and stability characteristics of the system and thereby provide a faster responding or more stable system.

Due to the differential areas of the pistons 180 at one end thereof and the enlarged end 181 thereof, a relatively high hydraulic pressure will not be delivered through the pistons 185 or 195 to the torque motor armature but pressures of relatively low magnitude but proportional to the pressures in the fluid circulating conduits 178 and 179. Therefore, these latter pressure reactions, being proportional to pressure changes in the fluid-circulating system of the transmission will provide pressure reactions of correct magnitudes to effect proper control over the piston of the stroke rate valve whereby substantially instantaneously to adjust the system for varying loads thereon.

It will be observed that in Fig. 16 we have shown a system which embodies means functioning as in the embodiment shown in Fig. 15 to apply a displacing force to the piston valve of the control piston which is substantially proportional to torque and torque rate of the armature of the torque motor or, in other words, to displacement and rate of change of displacement of the control or error. It will be noted that the Sylphon bellows 169 and 170 and their associated springs function in connection with the hydraulic circuit associated therewith, which is the equivalent of that shown in Fig. 15, to provide a signal proportional to torque and torque rate in substantially the same manner as hereinbefore described. However, in Fig. 16 we have additionally shown a further means for hydraulically controlling the system to compensate for changes in load. This latter signal is in addition to the primary control signals proportional to displacement or torque and torque rate and does not affect the servo or the control over the servo system other than as hereinabove described to compensate for load changes and the like.

It will, of course, be understood that further pressure reactions or differential pressure reactions may be derived from various portions of a servo system and applied to the torque motor in substantially the same or a manner similar to that hereinbefore described in connection with the system comprising conduits 184 and 194.

It will be understood that we prefer to employ oil as the working medium in our servo systems. Furthermore, it will be understood, although we have not illustrated the return connections, that provision is made to return the fluid discharged through the various orifices to the sump of the system.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A valve for controlling fluid flow to an element movable thereby comprising a valve body provided with a longitudinal bore having zones of unequal transverse area, an inlet passage, an exhaust passage, and a second pair of passages communicating through ports with said longitudinal bore in axially spaced relation, said second pair of passages being adapted to convey fluid to and from opposite sides of said element, a piston valve having spaced lands slidably fitted within said zones of the longitudinal bore, a first pair of lands of lesser transverse area being arranged cooperatively with said ports to control the flow of fluid under pressure from said inlet passage to one of said second pair of passages and the exhaust of fluid from the other of said second pair of passages to said exhaust passage, the port of said exhaust passage lying between adjacent lands of lesser and greater area, and means for causing the exhausting fluid to develop a pressure in the space between said adjacent lands.

2. A valve for controlling fluid flow to an element movable thereby comprising a valve body provided with a longitudinal bore having zones of unequal transverse area, an inlet passage, an exhaust passage, and a second pair of passages communicating through ports with said longitudinal bore in axially spaced relation, said second pair of passages being adapted to convey fluid to and from opposite sides of said element, a piston valve having spaced lands slidably fitted within said zones of the longitudinal bore, a first pair of lands of lesser transverse area being arranged cooperatively with said ports to control the flow of fluid under pressure from said inlet passage to one of said second pair of passages and the exhaust of fluid from the other of said second pair of passages to said exhaust passage, the port of said exhaust passage lying between adjacent lands of lesser and greater area, and means forming a restricting orifice associated with the exhaust passage in said valve body for causing the exhausting fluid to develop a pressure in the space between said adjacent lands.

3. A valve for controlling fluid flow to an element movable thereby comprising a valve body provided with a longitudinal bore of a lesser diameter in an intermediate zone and of a greater diameter adjacent both ends of said intermediate zone, an inlet passage communicating through an inlet port with said intermediate zone, a first pair of passages adapted to convey fluid to and from opposite sides of said element and communicating through ports with said intermediate zone and on opposite sides of said inlet port and a pair of exhaust passages communicating through exhaust ports with said bore and on opposite sides respectively of the ports of said pair of passages, a piston valve having spaced lands, two thereof being slidably fitted within the intermediate zone of said bore to control the flow of fluid from said inlet passage to one of said first pair of passages and simultaneously to control the flow of fluid from the other of said first pair of passages to one of said exhaust passages, and one land being slidably fitted within each end zone of said bore and spaced from adjacent lands with an exhaust port therebetween, and means associated with the exhaust passages for retarding the flow of fluid therethrough.

4. A valve for controlling fluid flow to an element movable thereby comprising a valve body provided with a longitudinal bore therein, a piston valve having spaced lands slidably fitted therewithin, said body having an inlet passage, an exhaust passage and a pair of passages all terminating in ports communicating with said longitudinal bore, said pair of passages being adapted to connect with opposite sides of said element, said valve piston being provided with means operable when said piston is moved in one direction to place the inlet and one of said pair of passages in communication and the other of said pair of passages and the exhaust port in communication, means forming a variable orifice for causing the exhausting fluid to develop a fluid pressure, means responsive to the fluid pressure so developed for varying the size of said orifice, and means subjected to said exhausting fluid for urging said valve piston in the opposite direction.

5. A valve for controlling fluid flow to an element movable thereby comprising a valve body provided with a longitudinal bore therein, a piston valve having spaced lands slidably fitted therewithin, said body having an inlet passage, an exhaust passage and a pair of passages all terminating in ports communicating with said longitudinal bore, said pair of passages being adapted to connect with opposite sides of said element, said valve piston being provided with means operable when said piston is moved in one direction to connect the inlet with one of said pair of passages and to connect the other of said pair of passages with the exhaust passage, means forming a first orifice of fixed size opening for causing the exhausting fluid to develop a fluid pressure and means forming a second, variable orifice associated with said exhaust passage and providing parallel paths for the exhaust of said fluid, means responsive to the fluid pressure so developed for varying the size of said second orifice, and means subjected to said exhausting fluid for urging said valve piston in the opposite direction.

6. A valve for controlling fluid flow to an element movable thereby comprising a valve body provided with a longitudinal bore having zones of unequal transverse area and an inlet passage, an exhaust passage and a pair of passages communicating through ports with said longitudinal bore in axially spaced relation, said pair of passages being adapted to connect with opposite sides of said element, a piston valve having spaced lands slidably fitted within said zones of the longitudinal bore, a first pair of lands of lesser transverse area being arranged cooperatively with said ports to control, when said piston is moved in one direction, the flow of fluid under pressure from said inlet passage to one of said pair of passages and the exhaust of fluid from the other of said pair of passages to said exhaust passage, the ports of said exhaust passage lying between adjacent lands of lesser and greater area, means forming a first orifice of fixed size opening for causing the exhausting fluid to develop a fluid pressure and means forming a second, variable orifice associated with said exhaust passage and providing parallel paths for the exhaust of said fluid, means responsive to the fluid pressure so developed for varying the size of said second orifice, and means subjected to said exhausting fluid for urging said valve piston in the opposite direction.

7. In a valve for controlling fluid flow to an element movable thereby, a valve body provided with a longitudinal bore therein, a sleeve rotatably mounted within said bore, said sleeve having zones of unequal transverse area and being provided with a plurality of lateral ports therein, said valve body being provided with an inlet passage, an exhaust passage and a pair of passages communicating through ports to register with the lateral ports of said sleeve, a piston valve having spaced lands slidably fitted within said zones of the sleeve, a first pair of lands of lesser transverse area being arranged cooperatively with said ports to control the flow of fluid under pressure from said inlet passage to one of said pair of passages and the exhaust of fluid from the other of said pair of passages to said exhaust passage, the port of said exhaust passage lying between adjacent lands of lesser and greater area, means for causing the exhausting fluid to develop a pressure in the space between said adjacent lands, and means for imparting rotary movement to said sleeve.

8. In a valve for controlling fluid flow to an element movable thereby, a valve body provided with a longitudinal bore therein, an inlet and exhaust passage and a pair of passages communicating through ports with said bore, piston means slidably fitted within said bore and provided with means for closing the ports to said pair of passages when said piston means lies in neutral or unactuated position but operable, when said piston means is moved, to pass fluid from the inlet port to one of the pair of passages and from the other of said pair of passages to the exhaust passage, said piston means and said valve body being so constructed, correlated and arranged as to expose a surface of sufficient magnitude of said piston means to exhausting fluid when said piston means is moved from its initial position under an applied force in one direction as to urge it in the opposite direction, means forming an orifice associated with the exhaust passage for causing said exhausting fluid to develop a pressure, and volumetrically variable means associated with said exhaust passage between said orifice and bore for providing a delayed restoring, fluid pressure signal acting on said piston means and substantially proportional to the rate of said applied force with an elimination of said signal when said piston means is restored to its neutral or unactuated position.

9. In a valve for controlling fluid flow to an element movable thereby, a valve body provided with a longitudinal bore therein, an inlet and exhaust passage and a pair of passages communicating through ports with said bore, said pair of passages being adapted to be connected to opposite sides of said element, piston means slidably fitted within said bore and provided with means for closing the ports to said pair of passages when said piston means lies in neutral or unactuated position but operable, when said piston means is moved, to pass fluid from the inlet port to one of the pair of passages and from the other of said pair of passages to the exhaust passage, said piston means and said valve body being so constructed, correlated and arranged as to expose a surface of sufficient magnitude of said piston means to exhausting fluid when said piston means is moved in one direction as to urge it in the opposite direction, means forming an orifice associated with the exhaust passage for causing said exhausting fluid to develop a pressure, volumetrically variable means communicating with the space between said orifice and the bore of said valve body and adapted to expand under a relatively high exhaust fluid pressure, and means for compressing said variable means whereby to provide a delayed pressure reaction.

10. In a valve for controlling fluid flow to an element movable thereby, a valve body provided with a longitudinal bore therein, an inlet and exhaust passage and a pair of passages communicating through ports with said bore, said pair of passages being adapted to be connected to opposite sides of said element, piston means slidably fitted within said bore and provided with means for closing the ports to said pair of passages when said piston means lies in neutral or unactuated position but operable, when said piston means is moved, to pass fluid from the inlet port to one of the pair of passages and from the other of said pair of passages to the exhaust passage, said piston means and said valve body being so constructed, correlated and arranged as to expose a surface of sufficient magnitude of said piston means to exhausting fluid when said piston means is moved in one direction as to urge it in the opposite direction, means forming an orifice associated with the exhaust passage for causing said exhausting fluid to develop a pressure, and expansible means comprising a bellows communicating with the space between said orifice and the bore of said valve body and resilient means for compressing said bellows.

11. In a servo system, the combination with a valve for controlling fluid flow to an element movable thereby and comprising a valve body provided with a longitudinal bore therein, an inlet, exhaust and a pair of passages communicating through ports with said bore, piston means slidably fitted within said bore and provided with means operable, when said piston means is moved, to pass fluid from the inlet port to one of said pair of passages and from the other of said pair of passages to the exhaust port, said piston means and said valve body being so constructed, correlated and arranged as to expose a surface of sufficient magnitude of said piston means to exhausting fluid when said piston means is moved in one direction as to urge it in the opposite direction, of means including signal responsive means for producing a fluid pressure and applying said pressure to move said piston means, means responsive to the produced fluid pressure including time delay means for producing a delayed restoring force and means for applying the restoring force to said signal-responsive means, the restoring force being of such magnitude and the applying means being so correlated and arranged with respect to said signal-responsive means as to only partially restore the signal-responsive means to its zero signal position.

12. In a servo system, the combination with a valve including movable means operable when moved in one direction to control a fluid flow to an element movable thereby and the exhaust of fluid therefrom, said valve including means responsive to exhausting fluid pressure for urging said movable means in the opposite direction and means for causing the exhausting fluid to develop a pressure, of signal-responsive means, means controlled by said signal-responsive means for actuating said fluid control means in accordance with displacement of said signal-responsive means from its zero signal position, means controlled by said signal-responsive means including time delay means for producing a delayed restoring force and means for applying said restoring force to said signal-responsive means, the restoring force being of such magnitude and the applying means being so correlated and arranged with respect to said signal-responsive means as to only partially restore the signal-responsive means to its zero signal position.

13. In a servo system, the combination with a valve including movable means operable when moved in one direction to control a fluid flow to an element movable thereby and the exhaust of fluid therefrom, said valve including means responsive to exhausting fluid pressure for urging said movable means in the opposite direction and means for causing the exhausting fluid to develop a pressure, of means for applying fluid pressure to actuate the fluid control means of said valve and signal-responsive means for controlling the last mentioned fluid pressure, means responsive to said last mentioned fluid pressure including time delay means for producing a delayed restoring force, and means for applying said force to said signal-responsive means, the restoring force being of such magnitude and the applying means being so correlated and arranged with respect to said signal-responsive means as to only partially restore the signal-responsive means to its zero signal position.

14. In a servo system, the combination with a valve including movable means operable when moved in one direction to control a fluid flow to an element movable thereby and the exhaust of fluid therefrom, said valve including means responsive to exhausting fluid pressure for urging said movable means in the opposite direction and means for causing the exhausting fluid to develop a pressure, of means for applying fluid pressure to actuate the fluid control means of said valve and signal-responsive means for controlling the last mentioned fluid pressure, volumetrically variable means communicating with said last mentioned fluid pressure, means actuated by fluid pressure in said volumetrically variable means for applying a restoring force to said signal-responsive means, and means for delaying the build-up of pressure in said volumetrically variable means.

15. In a servo system, the combination with a valve including movable means for controlling the flow of fluid to and the exhaust of fluid from an element movable thereby, of means for applying fluid pressure to actuate said valve, signal-responsive means for controlling said fluid pressure in accordance with displacement of said signal-responsive means from its zero-signal position, and means responsive to the controlled fluid pressure including time delay means for producing a delayed restoring force and means for applying said force to said signal-responsive means, the restoring force being of such magnitude and the applying means being so correlated and arranged with respect to said signal-responsive means as to only partially restore the signal-responsive means to its zero signal position.

16. In a system for controlling the operation of a fluid driven motor means and including means for supplying fluid under pressure to said motor and means for exhausting fluid therefrom, the combination with valve means for controlling the admission to and exhaust of fluid from said motor means, of means forming a variable orifice associated with said exhaust means for causing the exhaust fluid to develop a fluid pressure, means responsive to the exhaust fluid pressure for varying the size of said orifice, and means subjected to said exhaust fluid for operating said valve means.

17. In a system for controlling the operation of a fluid driven motor means and including means for supplying fluid under pressure to said motor and means for exhausting fluid therefrom, the combination with valve means for controlling the admission to and exhaust of fluid from said motor means, of means forming a first orifice for causing the exhausting fluid to develop a fluid pressure, means forming a variable orifice associated with said exhaust means for causing the exhausting fluid to develop a fluid pressure, means responsive to the exhaust fluid pressure for varying the size of said variable orifice, and means subjected to the exhaust fluid pressure produced by said orifices for operating said valve.

18. The combination recited in claim 16 in which the valve means includes means defining ports connected in the system and a piston valve cooperable with said ports and movable from a neutral position to cause an operation of the motor means, and the exhaust fluid is applied to said piston valve in a manner to restore it to its neutral position.

19. The combination recited in claim 17 in which the valve means includes means defining ports connected in the system and a piston valve cooperable with said ports and movable from a neutral position to cause an operation of the motor means, and the exhaust fluid is applied to said piston valve in a manner to restore it to its neutral position.

JAMES A. PEOPLES, Jr.
RICHARD SCHEIB, Jr.
RAYMOND C. GOERTZ.

REFERENCES CITED

The following references are of record in the file of this patent:

UNITED STATES PATENTS

| Number | Name | Date |
|---|---|---|
| 901,613 | Herrgott | Oct. 20, 1908 |
| 1,441,594 | Melcher | Jan. 9, 1923 |
| 1,530,445 | Warren | Mar. 17, 1925 |
| 1,718,673 | Wettstein | June 25, 1929 |
| 1,790,620 | Davis | Jan. 27, 1931 |
| 1,876,104 | Tucker | Sept. 6, 1932 |
| 1,972,852 | Albright | Sept. 11, 1934 |
| 2,016,824 | Smith | Oct. 8, 1935 |
| 2,106,036 | O'Conner | Jan. 18, 1938 |
| 2,117,891 | Kalin | May 17, 1938 |
| 2,140,037 | Swisher | Dec. 13, 1938 |
| 2,160,779 | Granat | May 30, 1939 |
| 2,169,982 | Manteuffel | Aug. 15, 1939 |
| 2,188,834 | Fischel | Jan. 30, 1940 |
| 2,189,823 | Vickers et al. | Feb. 13, 1940 |
| 2,191,792 | Hill | Feb. 27, 1940 |
| 2,207,373 | Dillworth | July 9, 1940 |
| 2,291,011 | Vickers | July 28, 1942 |
| 2,333,184 | Kalin | Nov. 2, 1943 |
| 2,377,300 | Pray | May 29, 1945 |
| 2,398,421 | Frische | Apr. 16, 1946 |

FOREIGN PATENTS

| Number | Country | Date |
|---|---|---|
| 724,287 | France | May 8, 1933 |
| | (Addition to No. 42,494) | |